W. WILBER.

Mill for Tempering Seeds.

No. 16,508.

2 Sheets—Sheet 1.

Patented Jan'y 27, 1857.

W. WILBER.
Mill for Tempering Seeds.

No. 16,508.

2 Sheets—Sheet 2.

Patented Jan'y 27, 1857.

UNITED STATES PATENT OFFICE.

WILLIAM WILBER, OF NEW ORLEANS, LOUISIANA.

IMPROVEMENT IN MILLS FOR TEMPERING OLEAGINOUS SEEDS.

Specification forming part of Letters Patent No. 16,508, dated January 27, 1857.

*To all whom it may concern:*

Be it known that I, WILLIAM WILBER, of New Orleans, in the parish of Orleans and State of Louisiana, have invented a new and useful Improvement in Mills for Tempering Oleaginous Seeds; and I do hereby declare the following to be a full, clear, and exact description of the same, reference being had to the acompanying drawings, making a part thereof, in which—

Figure 1:
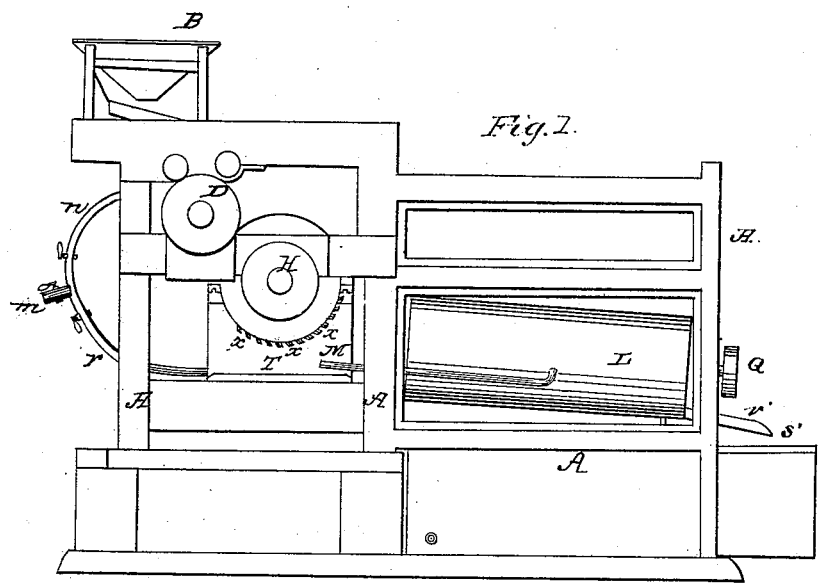
Figure 3:
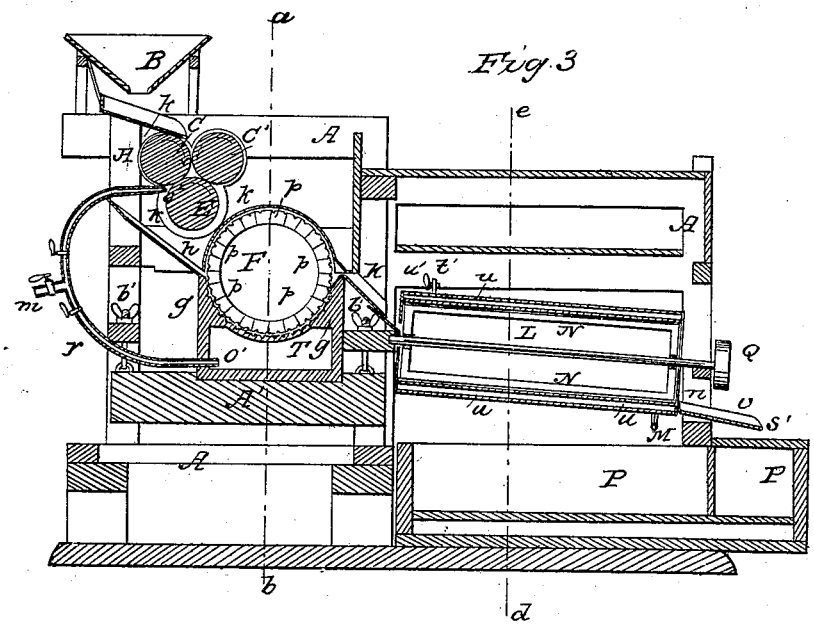
Figure 2:
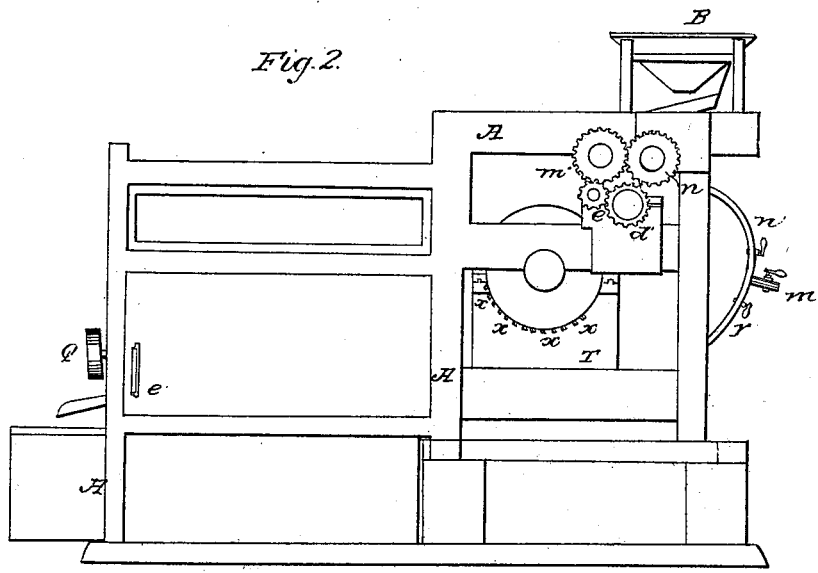
Figure 4:
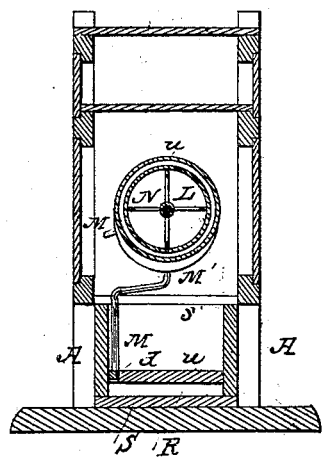
Figure 5:
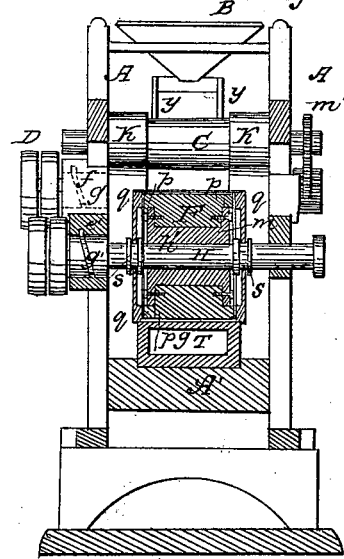
Figure 6:
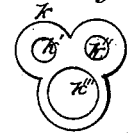
Figure 7:
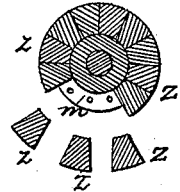

Figure 1 represents a view from one of the sides of the mill. Fig. 2 represents a view from the opposite side thereof. Fig. 3 represents a longitudinal vertical section. Fig. 4 represents a transverse section through the line $e\ d$. Fig. 5 represents a similar section through the line $a\ b$. Figs. 6 and 7 represent details of the machine.

Similar letters in the several figures denote like parts in all.

The nature of my invention relates to an arrangement of machinery whereby oleaginous seeds may be subjected to the direct and indirect action of steam in their transmission or passage through the machine from the grinding to the pressing apparatus, or to the place from whence it is taken or conveyed to the pressing apparatus, as will be described.

To enable others skilled in the art to make and use my invention, I will proceed to describe the same with reference to the drawings.

The apparatus is supported by strong wooden frames A on both sides, which are connected by beams and braces. The seed is thrown into the hopper B, whence it passes onto the crushing-rollers C C'. These crushing-rollers, made of cast-iron, receive their rotary motion through the cogged wheels $m'$ and $n'$ from the pinions $c'$ and $d'$, which latter, being on the axis of the crushing-roller E, receives its motion, which is rotary, from pulley D. The rollers C C' have a simple rotary motion around their axis. The roller E, besides having a rotary motion, receives a transverse reciprocating motion parallel to its axis, which is produced by the action of a fixed pin, $f$, Fig. 5, working in a groove, $g$, which is in the circumference of the crushing-roller E. The seeds fall from the hopper in between the crushing-rollers C C', which rotate in opposite directions, as the arrows show, then pass down to the roller E, thence through between C and E, whence they fall on the inclined plate $h$. The sliding reciprocating motion prevents the seeds from adhering onto the rollers C C'. The crushing-rollers C C' and E are hung in boxes K, (shown in Figs. 3 and 5, and represented separately in Fig. 6,) $k'$ and $k''$ being the boxes for the journals of the rollers C and C', and $k'''$ being the box for the crushing-roller E, which has no journals, but a uniform diameter, on account of its sliding motion. The object in applying these boxes is to keep the seed or its fibrous covering from getting onto the journals, and thus clogging them, and is prevented from passing into the journals by the rim $y\ y$ of these boxes projecting over the rollers. As the seed passes between the crushing-rollers C and E, a jet of steam, entering into a pipe at $m$, passes through $n$ and the mouth-piece $o$, and acts directly on the seed, thereby both heating and moistening the seed, and thus preparing them for extracting the oils. From the plate $h$ the seed passes to the grinding-cylinder F. The grinding-surface of this cylinder is also extended to or placed on its ends, and is represented in a side view at $p\ p\ p$ in Fig. 3, and a sectional view of which is represented at $p\ p\ p\ p$ in Fig. 5. As the cylinder F rotates round its axis, the grinding-surfaces $p$ operate against stationary grinding-surfaces $q$, which are on the inner side of a concave, G. The shaft H of the grinding-cylinder has on its circumference a groove, $g'$, operating in a similar manner as a cam. Said groove slides on a stationary pin, and by that means produces a sliding reciprocating motion of the shaft H parallel to its axis. The plates on which the grinding-surfaces $q$ are run into a groove on the circumference of the shaft H, and by this participate in the reciprocating sliding motion. These same plates are provided with grinding-teeth $x$, as shown in Figs. 1 and 2, which play in respective grooves, and which by their sliding reciprocating motion prevent the escape of seeds on the sides of the concave during the passage of the seeds between the grinding-cylinder and the concave. A jet of steam enters from steam-pipe $r$ through $o'$ into the chamber T, thereby heating the concave and with it the seed during the process of grinding. The concave, which is of cast-iron, rests on a block or frame, A', which can be raised or lowered by the set-screws $b'$, and by it the grinding can be regulated to any degree of fineness. The grinding-cylinder is of cast-iron, and consists of cylinder $h'$, secured by wedges on shaft H, which cylinder is provided with flanges $m$, in Figs. 5 and 7, into which the grinding-surfaces consisting of separate pieces $h'$, as shown in a sectional view, Fig. 7, are inserted and secured by bolts, so as to enable the operator to withdraw these pieces whenever the dress of the mill is worked out, and to replace them by new ones. The seed, having gone through the process of grinding, as described, passes up to plate K, and thence into the cylinder L. (Shown in a section, Fig. 3.) This cylinder L is made of sheet-iron, and has a double shell, which contains the hollow space $u$. Into this space steam is introduced by means of the steam-pipe M, Figs. 1 and 4, which takes the steam from chamber T.

In the inner part of the cylinder is a stirring apparatus, N, Figs. 3 and 4, which by its rotating motion prevents the ground seeds from getting overheated, said stirring apparatus receiving its motion from pulley Q. The ground seed, passing through the inclined cylinder, leaves through the opening $n$, which can be shut by slide $e'$, Fig. 2, and then passes to plate $v$, thence into the box P, which is covered with a removable top, $s'$. The box P is a sliding box, and can be drawn out like a drawer. It is capable of containing a quantity of ground seed, and is intended for holding the ground seed until a sufficient quantity has collected to be brought to the press. To keep the ground seed hot in this sliding box, a steam-pipe, M', at the lower end of cylinder L leads the steam out of space $u$ into space R, formed by the real bottom S and the false bottom U of the box P, and this chamber, being filled with steam, keeps the ground seed hot which collects in box P. The box P being a sliding box, and the steam-pipe M' stationary, said steam-pipe has to pass through a narrow strip, $a'$, of the false bottom U, on which the box slides. From this box the seeds are taken out and carried to the press.

A steam-pipe, $t'$, is also attached to the cylinder L, which pipe extends through into the interior of said cylinder, and is furnished with a stop-cock, $u'$, for the purpose of subjecting the seeds or ground material in their passage through said cylinder to the direct action of steam, in addition to the indirect action it is subjected to by the steam in the chamber or space $u$ around the cylinder, and by the cock $u'$, to regulate its introduction as the condition of the seed may require, the object being to introduce heat with moisture in such quantities as will prepare the ground seeds for the press, and so that they will readily give up the oil contained therein.

Having thus fully described the nature of my invention, what I claim therein as new, and desire to secure by Letters Patent, is—

The arrangement of machinery by which oleaginous seeds, as they are being tempered, shall be subjected to the direct and indirect action of steam in their transmission through the machine from the grinding to where it is taken, preparatory to its being pressed, as herein described and represented.

WILLIAM WILBER.

Witnesses:
   A. B. STOUGHTON,
   THOMAS H. UPPERMAN.